United States Patent
Giles et al.

(10) Patent No.: US 12,447,118 B2
(45) Date of Patent: Oct. 21, 2025

(54) HAIR TREATMENT COMPOSITIONS

(71) Applicant: Conopco, Inc., Englewood Cliffs, NJ (US)

(72) Inventors: Colin Christopher David Giles, Wirral (GB); Thomas Richard Pointon, Warrington (GB); Benjamin Jesukumar Rajapandian, Chester (GB); Glyn Roberts, Wirral (GB); Rongrong Zhou, Wirral (GB)

(73) Assignee: Conopco, Inc., Englewood Cliffs, NJ (US)

( * ) Notice: Subject to any disclaimer, the term of this patent is extended or adjusted under 35 U.S.C. 154(b) by 786 days.

(21) Appl. No.: 17/767,142

(22) PCT Filed: Oct. 7, 2020

(86) PCT No.: PCT/EP2020/078190
§ 371 (c)(1),
(2) Date: Apr. 7, 2022

(87) PCT Pub. No.: WO2021/069533
PCT Pub. Date: Apr. 15, 2021

(65) Prior Publication Data
US 2022/0370318 A1 Nov. 24, 2022

(30) Foreign Application Priority Data
Oct. 8, 2019 (EP) .................................. 19201916

(51) Int. Cl.
*A61K 8/365* (2006.01)
*A61K 8/81* (2006.01)
*A61Q 5/02* (2006.01)
*C11D 1/65* (2006.01)

(52) U.S. Cl.
CPC ............ *A61K 8/365* (2013.01); *A61K 8/8147* (2013.01); *A61Q 5/02* (2013.01); *C11D 1/65* (2013.01)

(58) Field of Classification Search
CPC ........ A61K 8/365; A61K 8/8147; A61Q 5/02; C11D 1/65
See application file for complete search history.

(56) References Cited

U.S. PATENT DOCUMENTS

| | | |
|---|---|---|
| 3,958,581 A | 5/1976 | Abegg et al. |
| 3,962,418 A | 6/1976 | Birkofer |
| 4,009,256 A | 2/1977 | Nowak, Jr. et al. |
| 5,194,639 A | 3/1993 | Connor et al. |
| 5,635,167 A | 6/1997 | Said et al. |
| 5,972,322 A * | 10/1999 | Rath ........... A61K 8/416 424/70.28 |
| 9,499,419 B2 | 11/2016 | De Rijk |
| 2004/0234491 A1* | 11/2004 | Brautigam ........... A61K 8/8152 424/70.28 |
| 2009/0214628 A1 | 8/2009 | de Rijk |
| 2009/0297466 A1* | 12/2009 | Gutmann ............... A61K 8/63 424/70.13 |
| 2016/0346174 A1* | 12/2016 | Sasik .................. A61Q 5/12 |

FOREIGN PATENT DOCUMENTS

| | | |
|---|---|---|
| CA | 2949527 | 5/2018 |
| WO | WO9206154 | 4/1992 |
| WO | WO9522311 | 8/1995 |
| WO | WO03094874 | 11/2003 |
| WO | WO2004054525 | 7/2004 |
| WO | WO2004054526 | 7/2004 |
| WO | WO2009040240 | 4/2009 |
| WO | WO2016188691 | 12/2016 |

OTHER PUBLICATIONS

GNPD Database (Online) Mintel; Shampoo; Matas Silkprotein; Aug. 2019; pp. 1-3, Record ID 6804429; Japan.
GNPD Database (Online) Mintel; Conditioner; Matas Silkprotein Balsam; Aug. 2019; pp. 1-3, Record ID 6804431; Japan.
GNPD Database (Online) Mintel; Shampoo; Diane Bonheur Nautral & Organic Blue Jasmine; Jul. 2019; pp. 1-4, Record ID 6717599; Japan.
Search Report and Written Opinion in EP19201916; Mar. 24, 2020; European Patent Office (EPO).
Database GNPD (Online) Mintel; Conditioner; Gron Balance Balsam; Oct. 29, 2018; pp. 1-2, XP055676432, Record ID 6087413; Denmark.
Database GNPD (Online) Mintel; Hair Treatment; Matas Natur; Sep. 2018; pp. 1-3, XP055676720, Record ID 5962385; retrieved from the internet www.gnpd.com—Mintel; Denmark.
Search Report and Written Opinion in PCTEP2020078190; Jan. 18, 2021; World Intellectual Property Org. (WIPO).
IPRP2 in PCTEP2020078190; Nov. 3, 2021; World Intellectual Property Org. (WIPO).

* cited by examiner

*Primary Examiner* — Jianfeng Song
(74) *Attorney, Agent, or Firm* — Byrne Poh LLP; Nina R. Horan

(57) ABSTRACT i) an alkali metal salt of an aldonic acid; ii) 0.1 to 5 wt %, citric acid by weight of the total composition; and iii) a surfactant; wherein the composition has a pH of from 3 to 5, provides repair to damaged internal protein of hair.

11 Claims, No Drawings

HAIR TREATMENT COMPOSITIONS

CROSS-REFERENCE TO RELATED APPLICATIONS

This application is a U.S. National Phase Application under 35 U.S.C. § 371 of International Application No. PCT/EP2020/078190, filed on Oct. 7, 2020, which claims priority to European Patent Application No. EP19201916.4 filed Oct. 8, 2019, the entire disclosures of which are incorporated herein by reference in their entireties, for any and all purposes.

FIELD OF THE INVENTION

The invention relates to the use of hair treatment compositions in the repair of hair damage.

BACKGROUND AND PRIOR ART

Consumers regularly subject their hair to intensive treatment, and care and styling routines to help them achieve their desired look. The actions performed by consumers introduce modifications to the chemistry of hair keratin protein which results in micro- and macro-structural changes and, in turn, changes fibre physical properties: the consequences of these are generally perceived by the consumer as damage.

Combing and brushing of hair mechanically abrades the fibre cuticle making this rougher and increasing the frictional characteristics. Hair lightening, such as bleaching, or colouring treatments generally involve an oxidative step to break down melanin and develop the new hair colour, but these processes also oxidise the hair fibre protein and the endogenous lipids. These reactions alter the number and types of covalent and non-covalent bonds within the fibre, and impact the thermal stability and mechanical properties of the hair. The internal protein of damaged hair typically has a reduced denaturation temperature compared to that of virgin hair.

Various organic molecules and combinations thereof have been suggested for use in the treatment of damaged hair.

WO 2004054526 describes hair treatment compositions for the care and repair of damaged hair, and for improving hair manageability, comprising a disaccharide, in particular trehalose.

WO 2004054525 describes hair treatment compositions for the care and repair of damaged hair, and for improving hair manageability, comprising a disaccharide, in particular trehalose, and a diol, in particular 3-methyl-1,3-butanediol.

WO 2009040240 discloses hair treatment compositions comprising a lactone and a disaccharide for the treatment of dry, damaged and/or unmanageable hair.

U.S. Pat. No. 5,635,167A discloses a process for the removal of exogenous metal ions which have become attached to human hair with a composition containing at least one chelating agent.

WO2016/188691A1 discloses a use of a composition comprising a lactone, a disaccharide, an inorganic salt and an organic acid or salt thereof, having a pH of 3 to 6.5, in the treatment of hair, to repair damage to hair protein.

CA2949527A1 discloses a hair mask composition, comprising: 50-60% of distilled water to comprise an aqueous solution; an amount of day sufficient to produce a paste; an amount of a moisturizer component effective for adding moisture to hair strands without leaving a greasy film on hair after shampoo; and an amount of plant protein which also acts as a strengthening hair agent.

DEFINITION OF THE INVENTION

In a first aspect of the invention, there is provided a composition comprising
i) an alkali metal salt of an aldonic acid;
ii) 0.1 to 5 wt %, citric acid by weight of the total composition; and
iii) a surfactant;
wherein the composition has a pH of from 3 to 5.

The present invention provides damage repair to the internal protein of hair. This may be shown by an increase in the denaturation temperature of the internal protein of hair.

A second aspect of the invention provides a method of repairing damaged internal protein of hair, comprising the step of applying a composition of the first aspect, which is a shampoo, and the step of applying a composition of the first aspect, which is a conditioner.

Preferably, these steps are sequential, whereby the shampoo is applied first, followed by the conditioner. Preferably the shampoo is rinsed off before the conditioner is applied.

A use is also provided, of a composition comprising an alkali metal salt of an aldonic acid and citric acid, to repair damage to hair internal protein, preferably wherein the alkali metal salt of an aldonic acid is sodium gluconate.

The Hair

The hair is preferably damaged hair, where the denaturation temperature of the internal protein of the hair is reduced.

The damage may be caused by mechanical means, for example combing and brushing, chemical means, exposure to heat, environmental means such as sunlight and exposure to damaging energy sources, for example light such as UV light. Chemical means includes treatments that involve an oxidative step, for example, hair lightening, such as bleaching, and colouring treatments. Preferably the hair is bleached, more preferably bleached multiple times.

GENERAL DESCRIPTION OF THE INVENTION

The Aldonic Acid

The composition of the invention comprises an alkali metal salt of an aldonic acid.

Aldonic acids are polyhydroxy acids resulting from oxidation of the aldehyde group of an aldose to a carboxylic acid group, and the acid of which can be represented by the following general formula:

$$R(CHOH)_n CH(OH)COOH$$

where R is H or an alkyl group (usually H) and n is an integer from 1 to 6.

The aldonic acids form intramolecular lactones by removing one mole of water between the carboxyl group and one hydroxyl group.

Suitable aldonic acids can be derived from the following lactones:
2,3-dihydroxypropanoic acid lactones (glyceric acid lactone);
2,3,4-trihydroxybutanoic acid lactones (stereoisomers: erythronolactone, threonolactone);
2,3,4,5-tetrahydroxypentanoic acid lactones (stereoisomers: ribonolactone, arabinolactone, xylonolactone, lyxonolactone);

2,3,4,5,6-pentahydroxyhexanoic acid lactones (stereoisomers: allonolactone, altronolactone, gluconolactone, mannolactone, gulonolactone, idonolactone, galactonolactone, talonolactone), and 2,3,4,5,6,7-hexahydroxyheptanoic acid lactones (stereoisomers: alloheptonolactone, altroheptonolactone, glucoheptonolactone, mannoheptonolactone, guloheptonolactone, idoheptonolactone, galactoheptonolactone, taloheptonolactone).

Mixtures of any of the above may also be used in the composition of the invention.

Preferably the aldonic acid is derived from a lactone that is a 2,3,4,5,6-pentahydroxyhexanoic acid lactone, selected from allonolactone, altronolactone, gluconolactone, mannolactone, gulonolactone, idonolactone, galactonolactone, talonolactone, most preferably gluconolactone.

The alkali metal is preferably selected from potassium and sodium, most preferably sodium.

A preferred alkali metal salt of an aldonic acid is sodium gluconate.

The total amount of alkali metal salt of an aldonic acid in hair treatment compositions of the invention ranges from 0.02 to 20 wt %, preferably from 0.05 to 2 wt %, more preferably from 0.05 to 0.8 wt % by total weight of the composition.

The composition for use in the present invention comprises citric acid, or salt thereof.

The amount of citric acid is from 0.1 to 5 wt %, by weight of the total composition, preferably 0.15 to 2 wt %, more preferably from 0.15 to 1 wt % and most preferably from 0.2 to 0.5 wt %.

The Hair Treatment Composition

Hair treatment compositions according to the invention may suitably take the form of shampoos, conditioners, sprays, mousses, gels, waxes or lotions.

Preferably, the hair treatment composition is a rinse off hair treatment composition, preferably selected from a shampoo, a conditioner and a mask, most preferably a shampoo and a conditioner. More preferably, the shampoo and the conditioner are used one after the other, and most preferably used repeatedly over several washes or treatments.

The hair treatment composition comprises a surfactant. The surfactant may be selected from an anionic surfactant, a cationic surfactant, a nonionic surfactant, a zwitterionic or amphoteric surfactant and mixtures thereof, preferably anionic surfactant and cationic surfactant. Suitable and preferred surfactants are described below.

Shampoos

Shampoo compositions of the invention are generally aqueous, i.e. they have water or an aqueous solution or a lyotropic liquid crystalline phase as their major component.

Suitably, the shampoo composition will comprise from 50 to 98%, preferably from 60 to 90% water by weight based on the total weight of the composition.

Shampoo compositions according to the invention will generally comprise one or more anionic cleansing surfactants which are cosmetically acceptable and suitable for topical application to the hair.

Examples of suitable anionic cleansing surfactants are the alkyl sulphates, alkyl ether sulphates, alkaryl sulphonates, alkanoyl isethionates, alkyl succinates, alkyl sulphosuccinates, alkyl ether sulphosuccinates, N-alkyl sarcosinates, alkyl phosphates, alkyl ether phosphates, and alkyl ether carboxylic acids and salts thereof, especially their sodium, magnesium, ammonium and mono-, di- and triethanolamine salts. The alkyl and acyl groups generally contain from 8 to 18, preferably from 10 to 16 carbon atoms and may be unsaturated. The alkyl ether sulphates, alkyl ether sulphosuccinates, alkyl ether phosphates and alkyl ether carboxylic acids and salts thereof may contain from 1 to 20 ethylene oxide or propylene oxide units per molecule.

Typical anionic cleansing surfactants for use in shampoo compositions of the invention include sodium oleyl succinate, ammonium lauryl sulphosuccinate, sodium lauryl sulphate, sodium lauryl ether sulphate, sodium lauryl ether sulphosuccinate, ammonium lauryl sulphate, ammonium lauryl ether sulphate, sodium dodecylbenzene sulphonate, triethanolamine dodecylbenzene sulphonate, sodium cocoyl isethionate, sodium lauryl isethionate, lauryl ether carboxylic acid and sodium N-lauryl sarcosinate.

Preferred anionic cleansing surfactants are sodium lauryl sulphate, sodium lauryl ether sulphate (n)EO, (where n is from 1 to 3), sodium lauryl ether sulphosuccinate(n)EO, (where n is from 1 to 3), ammonium lauryl sulphate, ammonium lauryl ether sulphate(n)EO, (where n is from 1 to 3), sodium cocoyl isethionate and lauryl ether carboxylic acid (n) EO (where n is from 10 to 20).

Mixtures of any of the foregoing anionic cleansing surfactants may also be suitable.

The total amount of anionic cleansing surfactant in shampoo compositions of the invention generally ranges from 0.5 to 45%, preferably from 1.5 to 35%, more preferably from 5 to 20% by total weight anionic cleansing surfactant based on the total weight of the composition.

Optionally, a shampoo composition of the invention may contain further ingredients as described below to enhance performance and/or consumer acceptability.

The composition can include co-surfactants, to help impart aesthetic, physical or cleansing properties to the composition.

An example of a co-surfactant is a nonionic surfactant, which can be included in an amount ranging from 0.5 to 8%, preferably from 2 to 5% by weight based on the total weight of the composition.

For example, representative nonionic surfactants that can be included in shampoo compositions of the invention include condensation products of aliphatic ($C_8$-$C_{18}$) primary or secondary linear or branched chain alcohols or phenols with alkylene oxides, usually ethylene oxide and generally having from 6 to 30 ethylene oxide groups.

Other representative nonionic surfactants include mono- or di-alkyl alkanolamides. Examples include coco mono- or di-ethanolamide and coco mono-isopropanolamide. Further nonionic surfactants which can be included in shampoo compositions of the invention are the alkyl polyglycosides (APGs). Typically, the APG is one which comprises an alkyl group connected (optionally via a bridging group) to a block of one or more glycosyl groups. Preferred APGs are defined by the following formula:

$$RO\text{-}(G)_n$$

wherein R is a branched or straight chain alkyl group which may be saturated or unsaturated and G is a saccharide group.

R may represent a mean alkyl chain length of from about $C_5$ to about $C_{20}$. Preferably R represents a mean alkyl chain length of from about $C_8$ to about $C_{12}$. Most preferably the value of R lies between about 9.5 and about 10.5. G may be selected from $C_5$ or $C_6$ monosaccharide residues, and is preferably a glucoside. G may be selected from the group comprising glucose, xylose, lactose, fructose, mannose and derivatives thereof. Preferably G is glucose.

The degree of polymerisation, n, may have a value of from about 1 to about 10 or more. Preferably, the value of n lies from about 1.1 to about 2. Most preferably the value of n lies from about 1.3 to about 1.5.

Suitable alkyl polyglycosides for use in the invention are commercially available and include for example those materials identified as: Oramix NS10 ex Seppic; Plantaren 1200 and Plantaren 2000 ex Henkel.

Other sugar-derived nonionic surfactants which can be included in compositions of the invention include the $C_{10}$-$C_{18}$ N-alkyl ($C_1$-$C_6$) polyhydroxy fatty acid amides, such as the $C_{12}$-$C_{18}$ N-methyl glucamides, as described for example in WO 92 06154 and U.S. Pat. No. 5,194,639, and the N-alkoxy polyhydroxy fatty acid amides, such as $C_{10}$-$C_{18}$ N-(3-methoxypropyl) glucamide.

A preferred example of a co-surfactant is an amphoteric or zwitterionic surfactant, which can be included in an amount ranging from 0.5 to about 8%, preferably from 1 to 4% by weight based on the total weight of the composition.

Examples of amphoteric or zwitterionic surfactants include alkyl amine oxides, alkyl betaines, alkyl amidopropyl betaines, alkyl sulphobetaines (sultaines), alkyl glycinates, alkyl carboxyglycinates, alkyl amphoacetates, alkyl amphopropionates, alkylamphoglycinates, alkyl amidopropyl hydroxysultaines, acyl taurates and acyl glutamates, wherein the alkyl and acyl groups have from 8 to 19 carbon atoms. Typical amphoteric and zwitterionic surfactants for use in shampoos of the invention include lauryl amine oxide, cocodimethyl sulphopropyl betaine, lauryl betaine, cocamidopropyl betaine and sodium cocoamphoacetate.

A particularly preferred amphoteric or zwitterionic surfactant is cocamidopropyl betaine.

Mixtures of any of the foregoing amphoteric or zwitterionic surfactants may also be suitable. Preferred mixtures are those of cocamidopropyl betaine with further amphoteric or zwitterionic surfactants as described above. A preferred further amphoteric or zwitterionic surfactant is sodium cocoamphoacetate.

The total amount of surfactant (including any co-surfactant, and/or any emulsifier) in a shampoo composition of the invention is generally from 1 to 50%, preferably from 2 to 40%, more preferably from 10 to 25% by total weight surfactant based on the total weight of the composition.

Cationic polymers are preferred ingredients in a shampoo composition of the invention for enhancing conditioning performance.

Suitable cationic polymers may be homopolymers which are cationically substituted or may be formed from two or more types of monomers. The weight average ($M_w$) molecular weight of the polymers will generally be between 100 000 and 2 million daltons. The polymers will have cationic nitrogen containing groups such as quaternary ammonium or protonated amino groups, or a mixture thereof. If the molecular weight of the polymer is too low, then the conditioning effect is poor. If too high, then there may be problems of high extensional viscosity leading to stringiness of the composition when it is poured.

The cationic nitrogen-containing group will generally be present as a substituent on a fraction of the total monomer units of the cationic polymer. Thus when the polymer is not a homopolymer it can contain spacer non-cationic monomer units. Such polymers are described in the CTFA Cosmetic Ingredient Directory, 3rd edition. The ratio of the cationic to non-cationic monomer units is selected to give polymers having a cationic charge density in the required range, which is generally from 0.2 to 3.0 meq/gm. The cationic charge density of the polymer is suitably determined via the Kjeldahl method as described in the US Pharmacopoeia under chemical tests for nitrogen determination.

Suitable cationic polymers include, for example, copolymers of vinyl monomers having cationic amine or quaternary ammonium functionalities with water soluble spacer monomers such as (meth)acrylamide, alkyl and dialkyl (meth)acrylamides, alkyl (meth)acrylate, vinyl caprolactone and vinyl pyrrolidine. The alkyl and dialkyl substituted monomers preferably have C1-C7 alkyl groups, more preferably C1-3 alkyl groups. Other suitable spacers include vinyl esters, vinyl alcohol, maleic anhydride, propylene glycol and ethylene glycol.

The cationic amines can be primary, secondary or tertiary amines, depending upon the particular species and the pH of the composition. In general secondary and tertiary amines, especially tertiary, are preferred.

Amine substituted vinyl monomers and amines can be polymerised in the amine form and then converted to ammonium by quaternization.

The cationic polymers can comprise mixtures of monomer units derived from amine- and/or quaternary ammonium-substituted monomer and/or compatible spacer monomers.

Suitable cationic polymers include, for example:
cationic diallyl quaternary ammonium-containing polymers including, for example, dimethyldiallylammonium chloride homopolymer and copolymers of acrylamide and dimethyldiallylammonium chloride, referred to in the industry (CTFA) as Polyquaternium 6 and Polyquaternium 7, respectively;
mineral acid salts of amino-alkyl esters of homo- and co-polymers of unsaturated carboxylic acids having from 3 to 5 carbon atoms, (as described in U.S. Pat. No. 4,009,256);
cationic polyacrylamides (as described in WO95/22311).

Other cationic polymers that can be used include cationic polysaccharide polymers, such as cationic cellulose derivatives, cationic starch derivatives, and cationic guar gum derivatives.

Cationic polysaccharide polymers suitable for use in compositions of the invention include monomers of the formula:

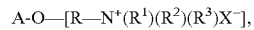

A—O—[R—N$^+$(R$^1$)(R$^2$)(R$^3$)X$^-$], wherein: A is an anhydroglucose residual group, such as a starch or cellulose anhydroglucose residual. R is an alkylene, oxyalkylene, polyoxyalkylene, or hydroxyalkylene group, or combination thereof. $R^1$, $R^2$ and $R^3$ independently represent alkyl, aryl, alkylaryl, arylalkyl, alkoxyalkyl, or alkoxyaryl groups, each group containing up to about 18 carbon atoms. The total number of carbon atoms for each cationic moiety (i.e., the sum of carbon atoms in $R^1$, $R^2$ and $R^3$) is preferably about 20 or less, and X is an anionic counterion.

Another type of cationic cellulose includes the polymeric quaternary ammonium salts of hydroxyethyl cellulose reacted with lauryl dimethyl ammonium-substituted epoxide, referred to in the industry (CTFA) as Polyquaternium 24. These materials are available from the Amerchol Corporation, for instance under the tradename Polymer LM-200. Other suitable cationic polysaccharide polymers include quaternary nitrogen-containing cellulose ethers (e.g. as described in U.S. Pat. No. 3,962,418), and copolymers of etherified cellulose and starch (e.g. as described in U.S. Pat. No. 3,958,581).

A particularly suitable type of cationic polysaccharide polymer that can be used is a cationic guar gum derivative, such as guar hydroxypropyltrimethylammonium chloride (commercially available from Rhodia in their JAGUAR trademark series). Examples of such materials are JAGUAR C135, JAGUAR C14, JAGUAR C15 and JAGUAR C17.

Mixtures of any of the above cationic polymers may be used.

Cationic polymer will generally be present in a shampoo composition of the invention at levels of from 0.01 to 5%, preferably from 0.05 to 1%, more preferably from 0.08 to 0.5% by total weight of cationic polymer based on the total weight of the composition.

Preferably an aqueous shampoo composition of the invention further comprises a suspending agent. Suitable suspending agents are selected from polyacrylic acids, cross-linked polymers of acrylic acid, copolymers of acrylic acid with a hydrophobic monomer, copolymers of carboxylic acid-containing monomers and acrylic esters, cross-linked copolymers of acrylic acid and acrylate esters, heteropolysaccharide gums and crystalline long chain acyl derivatives. The long chain acyl derivative is desirably selected from ethylene glycol stearate, alkanolamides of fatty acids having from 16 to 22 carbon atoms and mixtures thereof. Ethylene glycol distearate and polyethylene glycol 3 distearate are preferred long chain acyl derivatives, since these impart pearlescence to the composition. Polyacrylic acid is available commercially as Carbopol 420, Carbopol 488 or Carbopol 493. Polymers of acrylic acid cross-linked with a polyfunctional agent may also be used; they are available commercially as Carbopol 910, Carbopol 934, Carbopol 941 and Carbopol 980. An example of a suitable copolymer of a carboxylic acid containing monomer and acrylic acid esters is Carbopol 1342. All Carbopol (trademark) materials are available from Goodrich.

Suitable cross-linked polymers of acrylic acid and acrylate esters are Pemulen TR1 or Pemulen TR2. A suitable heteropolysaccharide gum is xanthan gum, for example that available as Kelzan mu.

Mixtures of any of the above suspending agents may be used. Preferred is a mixture of cross-linked polymer of acrylic acid and crystalline long chain acyl derivative.

Suspending agent will generally be present in a shampoo composition of the invention at levels of from 0.1 to 10%, preferably from 0.5 to 6%, more preferably from 0.9 to 4% by total weight of suspending agent based on the total weight of the composition.

Conditioners

Conditioner compositions will typically comprise one or more cationic conditioning surfactants which are cosmetically acceptable and suitable for topical application to the hair.

Preferably, the cationic conditioning surfactants have the formula $N^+(R^1)(R^2)(R^3)(R^4)$, wherein $R^1$, $R^2$, $R^3$ and $R^4$ are independently ($C_1$ to $C_{30}$) alkyl or benzyl.

Preferably, one, two or three of $R^1$, $R^2$, $R^3$ and $R^4$ are independently ($C_4$ to $C_{30}$) alkyl and the other $R^1$, $R^2$, $R^3$ and $R^4$ group or groups are ($C_1$-$C_6$) alkyl or benzyl.

More preferably, one or two of $R^1$, $R^2$, $R^3$ and $R^4$ are independently ($C_6$ to $C_{30}$) alkyl and the other $R^1$, $R^2$, $R^3$ and $R^4$ groups are ($C_1$-$C_6$) alkyl or benzyl groups. Optionally, the alkyl groups may comprise one or more ester (—OCO— or —COO—) and/or ether (—O—) linkages within the alkyl chain. Alkyl groups may optionally be substituted with one or more hydroxyl groups. Alkyl groups may be straight chain or branched and, for alkyl groups having 3 or more carbon atoms, cyclic. The alkyl groups may be saturated or may contain one or more carbon-carbon double bonds (e.g., oleyl). Alkyl groups are optionally ethoxylated on the alkyl chain with one or more ethyleneoxy groups.

Suitable cationic conditioning surfactants for use in conditioner compositions according to the invention include cetyltrimethylammonium chloride, behenyltrimethylammonium chloride, cetylpyridinium chloride, tetramethylammonium chloride, tetraethylammonium chloride, octyltrimethylammonium chloride, dodecyltrimethylammonium chloride, hexadecyltrimethylammonium chloride, octyldimethylbenzylammonium chloride, decyldimethylbenzylammonium chloride, stearyldimethylbenzylammonium chloride, didodecyldimethylammonium chloride, dioctadecyldimethylammonium chloride, tallowtrimethylammonium chloride, dihydrogenated tallow dimethyl ammonium chloride (e.g., Arquad 2HT/75 from Akzo Nobel), cocotrimethylammonium chloride, PEG-2-oleammonium chloride and the corresponding hydroxides thereof. Further suitable cationic surfactants include those materials having the CTFA designations Quaternium-5, Quaternium-31 and Quaternium-18. Mixtures of any of the foregoing materials may also be suitable. A particularly useful cationic surfactant for use in conditioners according to the invention is cetyltrimethylammonium chloride, available commercially, for example as GENAMIN CTAC, ex Hoechst Celanese. Another particularly useful cationic surfactant for use in conditioners according to the invention is behenyltrimethylammonium chloride, available commercially, for example as GENAMIN KDMP, ex Clariant.

Another example of a class of suitable cationic conditioning surfactants for use in the invention, either alone or in admixture with one or more other cationic conditioning surfactants, is a combination of (i) and (ii) below:

(i) an amidoamine corresponding to the general formula (I):

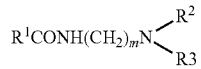

in which $R^1$ is a hydrocarbyl chain having 10 or more carbon atoms, $R^2$ and $R^3$ are independently selected from hydrocarbyl chains of from 1 to 10 carbon atoms, and m is an integer from 1 to about 10; and (ii) an acid.

As used herein, the term hydrocarbyl chain means an alkyl or alkenyl chain.

Preferred amidoamine compounds are those corresponding to formula (I) in which $R^1$ is a hydrocarbyl residue having from about 11 to about 24 carbon atoms, $R^2$ and $R^3$ are each independently hydrocarbyl residues, preferably alkyl groups, having from 1 to about 4 carbon atoms, and m is an integer from 1 to about 4.

Preferably, $R^2$ and $R^3$ are methyl or ethyl groups.

Preferably, m is 2 or 3, i.e. an ethylene or propylene group.

Preferred amidoamines useful herein include stearamidopropyldimethylamine, stearamidopropyldiethylamine, stearamidoethyldiethylamine, stearamidoethyldimethylamine, palmitamidopropyldimethylamine, palmitamidopropyldiethylamine, palmitamidoethyldiethylamine, palmitamidoethyldimethylamine, behenamidopropyldimethylamine, behenamidopropyldiethylmine, behenamidoethyldiethylamine, behenamidoethyldimethylamine, arachidamidopropyldimethylamine, arachidamidopropyldiethylamine, arachidamidoethyldiethylamine, arachidamidoethyldimethylamine, and mixtures thereof.

Particularly preferred amidoamines useful herein are stearamidopropyldimethylamine, stearamidoethyldiethylamine, and mixtures thereof.

Commercially available amidoamines useful herein include:

stearamidopropyldimethylamine with tradenames LEXAMINES-13 available from Inolex (Philadelphia Pennsylvania, USA) and AMIDOAMINE MSP available from Nikko (Tokyo, Japan), stearamidoethyldiethylamine with a tradename AMIDOAMINE S available from Nikko, behenamidopropyldimethylamine with a tradename INCROMINE BB available from Croda (North Humberside, England), and various amidoamines with tradenames SCHERCODINE series available from Scher (Clifton New Jersey, USA).

Acid (ii) may be any organic or mineral acid which is capable of protonating the amidoamine in the hair treatment composition. Suitable acids useful herein include hydrochloric acid, acetic acid, tartaric acid, fumaric acid, lactic acid, malic acid, succinic acid, and mixtures thereof. Preferably, the acid is selected from the group consisting of acetic acid, tartaric acid, hydrochloric acid, fumaric acid, and mixtures thereof.

The primary role of the acid is to protonate the amidoamine in the hair treatment composition thus forming a tertiary amine salt (TAS) in situ in the hair treatment composition. The TAS in effect is a non-permanent quaternary ammonium or pseudo-quaternary ammonium cationic surfactant.

Suitably, the acid is included in a sufficient amount to protonate all the amidoamine present, i.e. at a level which is at least equimolar to the amount of amidoamine present in the composition.

In conditioners of the invention, the level of cationic conditioning surfactant will generally range from 0.01 to 10%, more preferably 0.05 to 7.5%, most preferably 0.1 to 5% by total weight of cationic conditioning surfactant based on the total weight of the composition.

Conditioners of the invention will typically also incorporate a fatty alcohol. The combined use of fatty alcohols and cationic surfactants in conditioning compositions is believed to be especially advantageous, because this leads to the formation of a lamellar phase, in which the cationic surfactant is dispersed.

Representative fatty alcohols comprise from 8 to 22 carbon atoms, more preferably 16 to 22. Fatty alcohols are typically compounds containing straight chain alkyl groups. Examples of suitable fatty alcohols include cetyl alcohol, stearyl alcohol and mixtures thereof. The use of these materials is also advantageous in that they contribute to the overall conditioning properties of compositions of the invention.

The level of fatty alcohol in conditioners of the invention will generally range from 0.01 to 10%, preferably from 0.1 to 8%, more preferably from 0.2 to 7%, most preferably from 0.3 to 6% by weight of the composition. The weight ratio of cationic surfactant to fatty alcohol is suitably from 1:1 to 1:10, preferably from 1:1.5 to 1:8, optimally from 1:2 to 1:5. If the weight ratio of cationic surfactant to fatty alcohol is too high, this can lead to eye irritancy from the composition. If it is too low, it can make the hair feel squeaky for some consumers.

Form of Composition

Hair treatment compositions according to the invention, particularly water-based shampoos and hair conditioners, will preferably also contain one or more silicone conditioning agents.

Particularly preferred silicone conditioning agents are silicone emulsions such as those formed from silicones such as polydiorganosiloxanes, in particular polydimethylsiloxanes which have the CTFA designation dimethicone, polydimethyl siloxanes having hydroxyl end groups which have the CTFA designation dimethiconol, and amino-functional polydimethyl siloxanes which have the CTFA designation amodimethicone.

The emulsion droplets may typically have a Sauter mean droplet diameter ($D_{3,2}$) in the composition of the invention ranging from 0.01 to 20 micrometer, more preferably from 0.2 to 10 micrometer.

A suitable method for measuring the Sauter mean droplet diameter ($D_{3,2}$) is by laser light scattering using an instrument such as a Malvern Mastersizer.

Suitable silicone emulsions for use in compositions of the invention are available from suppliers of silicones such as Dow Corning and GE Silicones. The use of such pre-formed silicone emulsions is preferred for ease of processing and control of silicone particle size. Such pre-formed silicone emulsions will typically additionally comprise a suitable emulsifier such as an anionic or nonionic emulsifier, or mixture thereof, and may be prepared by a chemical emulsification process such as emulsion polymerisation, or by mechanical emulsification using a high shear mixer. Pre-formed silicone emulsions having a Sauter mean droplet diameter ($D_{3,2}$) of less than 0.15 micrometers are generally termed microemulsions.

Examples of suitable pre-formed silicone emulsions include emulsions DC2-1766, DC2-1784, DC-1785, DC-1786, DC-1788 and microemulsions DC2-1865 and DC2-1870, all available from Dow Corning. These are all emulsions/microemulsions of dimethiconol. Also suitable are amodimethicone emulsions such as DC2-8177 and DC939 (from Dow Corning) and SME253 (from GE Silicones).

Also suitable are silicone emulsions in which certain types of surface active block copolymers of a high molecular weight have been blended with the silicone emulsion droplets, as described for example in WO03/094874. In such materials, the silicone emulsion droplets are preferably formed from polydiorganosiloxanes such as those described above. One preferred form of the surface active block copolymer is according to the following formula:

$HO(CH_2CH_2O)_x(CH(CH_3)CH_2O)_y(CH_2CH_2O)_xH$ wherein the mean value of x is 4 or more and the mean value of y is 25 or more.

Another preferred form of the surface active block copolymer is according to the following formula:

$(HO(CH_2CH_2O)_a(CH(CH_3)CH_2O)_b)_2-N-CH_2-CH_2-N((OCH_2CH(CH_3))_b(OCH_2CH_2)_aOH)_2$ wherein the mean value of a is 2 or more and the mean value of b is 6 or more.

Mixtures of any of the above described silicone emulsions may also be used.

The above described silicone emulsions will generally be present in a composition of the invention at levels of from 0.05 to 10%, preferably 0.05 to 5%, more preferably from 0.5 to 2% by total weight of silicone based on the total weight of the composition.

Other Ingredients

A composition of the invention may contain other ingredients for enhancing performance and/or consumer acceptability. Such ingredients include fragrance, dyes and pigments, pH adjusting agents, pearlescers or opacifiers, viscosity modifiers, and preservatives or antimicrobials. Each of these ingredients will be present in an amount effective to accomplish its purpose. Generally these optional ingredients are included individually at a level of up to 5% by weight of the total composition.

Composition 2, in accordance with the invention, are conditioner compositions.

Compositions C and D are comparative conditioners.

Compositions A and C do not contain any damage repair agents.

Compositions B and D are representative of the prior art.

Compositions E and F are comparative examples of a shampoo and conditioner that contain citric acid but no alkali metal salt of an aldonic acid.

TABLE 1

Ingredients (wt %) of Compositions 1-2 in accordance with the invention and comparative compositions A-F.

| | Amount (wt %) | | | | | | | |
|---|---|---|---|---|---|---|---|---|
| | 1 | A | B | E | 2 | C | D | F |
| Gluconolactone | — | — | 0.4 | — | — | — | 0.1 | — |
| Trehalose | — | — | 0.1 | — | — | — | 0.1 | — |
| Sodium sulphate | — | — | 0.1 | — | — | — | 0.01 | — |
| Na Gluconate | 0.4 | — | — | — | 0.1 | — | — | — |
| Citric acid | 0.2 | — | — | 0.2 | 0.3 | — | — | 0.3 |
| Suspending agent | 0.4 | 0.4 | 0.4 | 0.4 | — | — | — | — |
| Sodium Laureth Ether Sulfate | 12.0 | 12.0 | 12.0 | 12.0 | — | — | — | — |
| Co-surfactant | 1.6 | 1.6 | 1.6 | 1.6 | — | — | — | — |
| Deposition aid | 0.2 | 0.2 | 0.2 | 0.2 | — | — | — | — |
| Cetearyl Alcohol | — | — | — | — | 4 | 4 | 4 | 4 |
| Behentrimonium Chloride | — | — | — | — | 1 | 1 | 1 | 1 |
| Stearamidopropyl Dimethylamine | — | — | — | — | 1 | 1 | 1 | 1 |
| Lactic Acid | — | — | — | — | 0.39 | 0.39 | 0.50 | 0.39 |
| Silicone | 0.75 | 0.75 | 0.75 | 0.75 | 2.14 | 2.14 | 2.14 | 2.14 |
| Sodium Chloride | 1.0 | 1.0 | 1.0 | 1.0 | 0.1 | 0.1 | 0.1 | 0.1 |
| Perfume | 0.70 | 0.70 | 0.70 | 0.70 | 0.65 | 0.65 | 0.65 | 0.65 |
| Water & minors | to 100 | to 100 | to 100 | to 100 | to 100 | to 100 | to 100 | to 100 |
| pH | 4.5 | 4.8 | 4.5 | 4.5 | 3.9 | 4.5 | 3.9 | 3.9 |

Hair treatment compositions of the invention are primarily intended for topical application to the hair and/or scalp of a human subject, either in rinse-off or leave-on compositions, for the treatment of dry, damaged and/or unmanageable hair.

The invention will be further illustrated by the following, non-limiting Example, in which all percentages quoted are by weight based on total weight unless otherwise stated.

EXAMPLES

The Hair

Virgin: The hair used in the following examples was dark brown European hair tresses 2.5 grams and 6 inches long.

Bleached: Virgin hair tresses were bleached according to the following protocol. Hair was bleached for 30 minutes with commercial bleaching powder mixed with 9% cream peroxide, 30 'vol'. Hair was then washed with 14% aqueous sodium laureth ether sulphate (SLES) solution before drying.

The double-bleached hair was dialysed prior to the experiments in 5 L of distilled water over a period of 72 hours, and the water was changed 3 times over this period. After dialysing, the hair tresses were left to dry overnight in a controlled environment (20° C. and 50% relative humidity).

The Compositions

Composition 1, in accordance with the invention, is a shampoo composition.

Compositions A and B are Comparative shampoos.

Treatment of the Hair

Hair (virgin and double-bleached) was first treated twice with an aqueous composition containing 14% Sodium Laureth Ether Sulphate (SLES) at 0.1 ml/1 g hair using 30 seconds lathering and 30 seconds rinse in tap water.

The hair was then treated with shampoo Compositions 1, A,B or E using the following method:

0.1 ml/1 g hair applied and lathered for 30 seconds followed by 30 seconds rinse in tap water.

Following treatment with the shampoo compositions, the hair was treated with Compositions 2, C, D or F as follows: 0.2 ml/1 g hair applied to hair for 60 seconds followed by 60 seconds rinse in tap water.

The hair tresses were then left to dry overnight at 20° C., 50% relative humidity.

Effect of Treatment by 1-2 and A-F on Hair Protein

In order to prepare hair samples for Differential Scanning calorimetry (DSC), 1 inch of hair was cut from the tip-end of each tress. Hair was then chopped into 1-2 mm sections.

Measurements were performed using a Mettler-Toledo DSC (with auto-sampler). 7-10 mg samples of dry, finely chopped hair was placed in the 'Medium Pressure Stainless Steel DSC Pans' and accurately weighed. 50 microlitres of deionised water was then added to each sample after which the pan lid was put on and the pans crimped shut to provide a hermetic seal. Pans were equilibrated for a minimum of 24 h ahead of any measurement to allow the hair to fully hydrate. The DSC was programmed to first heat each sample to 100° C. for 3 min and then to warm them further from 100 to 180° C. at a constant rate of 5° C. min'.

TABLE 2

Mean denaturation temperatures and change in denaturation temperature for treatment over successive five wash cycles for hair treated with Compositions 1-2 in accordance with the invention and Comparative Compositions A-D.

| Treatment | Wash # | Mean Denaturation Temperature (° C.) | Standard Deviation (+/−) |
|---|---|---|---|
| Virgin Hair | 0 | 147.59 | 0.30 |
| Double Bleached Hair | 0 | 144.78 | 0.56 |
| Double bleached hair + Compositions A then C | 5 | 145.12 | 0.26 |
| Double bleached hair + Compositions 1 then 2 | 5 | 147.79 | 0.30 |
| Double bleached hair + Compositions B then D | 5 | 146.72 | 0.27 |
| Double bleached hair + Compositions E then F | 5 | 146.65 | 0.35 |

It will be seen that bleached hair treated with Compositions 1 and 2 in accordance with the invention increase 3.01° C. in the denaturation temperature, to the state of virgin hair, after 5 wash cycles, while bleached hair treated with Composition A and C only increase 0.34° C. in hair denaturation temperature.

The prior art compositions B and D increase 1.94° C. in the denaturation temperature which is less than that from Composition 1 and 2.

The invention claimed is:

1. A composition consisting of:
   i) 0.02 wt % to 20 wt % by weight of the total composition of an alkali metal salt of an aldonic acid, which is sodium gluconate;
   ii) 0.1 wt % to 5 wt % by weight of the total composition of citric acid;
   iii) a surfactant, selected from the group consisting of an anionic surfactant and a cationic surfactant;
   iv) optionally a co-surfactant selected from a nonionic surfactant, amphoteric or zwitterionic surfactant or mixtures thereof;
   v) optionally a cationic polymer or a mixture thereof;
   vi) optionally a suspending agent;
   vii) optionally a fatty alcohol;
   viii) optionally a silicone conditioning agent or mixtures thereof;
   ix) optionally a fragrance, dye, pigment, pH adjusting agent, pearlescer, opacifier, viscosity modifier, preservative, antimicrobial, or a mixture thereof; and
   XX) water;
   wherein the composition has a pH of from 3 to 5.

2. The composition as claimed in claim 1, wherein the sodium gluconate is present in an amount from 0.05 wt % to 2 wt % by weight of the composition.

3. The composition of claim 1, wherein the sodium gluconate is present in an amount from 0.05 wt % to 0.8 wt % by weight of the composition.

4. The composition of claim 1, wherein the citric acid is present in an amount from 0.15 wt % to 2 wt %, by weight of the composition.

5. The composition of claim 1, wherein the citric acid is present in an amount from 0.15 wt % to 1 wt % by weight of the composition.

6. The composition of claim 1, wherein the citric acid is present in an amount from 0.2 wt % to 0.5 wt % by weight of the composition.

7. The composition as claimed in claim 1, wherein the composition is a rinse off hair treatment composition, selected from a shampoo, a conditioner or a mask.

8. The composition as claimed in claim 7, wherein the composition is a conditioner.

9. The composition as claimed in claim 8, wherein the composition comprises a cationic surfactant selected from cetyltrimethylammonium chloride, behenyltrimethylammonium chloride, cetylpyridinium chloride, tetramethylammonium chloride, tetraethylammonium chloride, octyltrimethylammonium chloride, dodecyltrimethylammonium chloride, hexadecyltrimethylammonium chloride, octyldimethylbenzylammonium chloride, decyldimethylbenzylammonium chloride, stearyldimethylbenzylammonium chloride, didodecyldimethylammonium chloride, dioctadecyldimethylammonium chloride, tallowtrimethylammonium chloride, dihydrogenated tallow dimethyl ammonium chloride, cocotrimethylammonium chloride, PEG-2-oleammonium chloride and the corresponding hydroxides thereof, Quaternium-5, Quaternium-31 and Quaternium-18.

10. The composition as claimed in claim 7, wherein the composition is a shampoo.

11. The composition as claimed in claim 10, wherein the composition comprises an anionic surfactant selected from sodium oleyl succinate, ammonium lauryl sulphosuccinate, sodium lauryl sulphate, sodium lauryl ether sulphate, sodium lauryl ether sulphosuccinate, ammonium lauryl sulphate, ammonium lauryl ether sulphate, sodium dodecylbenzene sulphonate, triethanolamine dodecylbenzene sulphonate, sodium cocoyl isethionate, sodium lauryl isethionate, lauryl ether carboxylic acid and sodium N-lauryl sarcosinate.

* * * * *